(12) United States Patent
Thangaraj et al.

(10) Patent No.: US 7,818,627 B2
(45) Date of Patent: Oct. 19, 2010

(54) SYSTEMS AND METHODS FOR GATHERING DEBUG INFORMATION

(75) Inventors: Senthil M. Thangaraj, Fremont, CA (US); Paresh Chatterjee, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 703 days.

(21) Appl. No.: 11/234,700

(22) Filed: Sep. 23, 2005

(65) Prior Publication Data

US 2007/0074082 A1    Mar. 29, 2007

(51) Int. Cl.
*G06F 11/00* (2006.01)
(52) U.S. Cl. ...................................... 714/42
(58) Field of Classification Search ............ 714/42
See application file for complete search history.

(56) References Cited

U.S. PATENT DOCUMENTS

| | | | |
|---|---|---|---|
| 6,370,635 B2 * | 4/2002 | Snyder | 712/32 |
| 6,467,054 B1 * | 10/2002 | Lenny | 714/42 |
| 6,526,567 B1 * | 2/2003 | Cobbett et al. | 717/124 |
| 6,681,354 B2 * | 1/2004 | Gupta | 714/725 |
| 7,020,803 B2 * | 3/2006 | Wolin et al. | 714/41 |
| 7,031,902 B1 * | 4/2006 | Catiller | 703/24 |
| 7,210,059 B2 * | 4/2007 | Jeddeloh | 714/5 |
| 7,441,158 B1 * | 10/2008 | Legako et al. | 714/46 |
| 2002/0065646 A1 * | 5/2002 | Waldie et al. | 703/26 |
| 2003/0005367 A1 * | 1/2003 | Lam | 714/42 |

* cited by examiner

*Primary Examiner*—Joshua A Lohn
(74) *Attorney, Agent, or Firm*—Cochran Freund & Young LLC (57) ABSTRACT

System and methods are disclosed for gathering debug information of a storage system of a computer system without requiring additional external hardware directly connected to the controller of the storage system.

20 Claims, 6 Drawing Sheets

SYSTEMS AND METHODS FOR GATHERING DEBUG INFORMATION

BACKGROUND

A. Technical Field

The present invention relates generally to the field of embedded systems, and more particularly, to systems and methods for gathering debug information from embedded systems.

B. Background of the Invention

Figure 1:
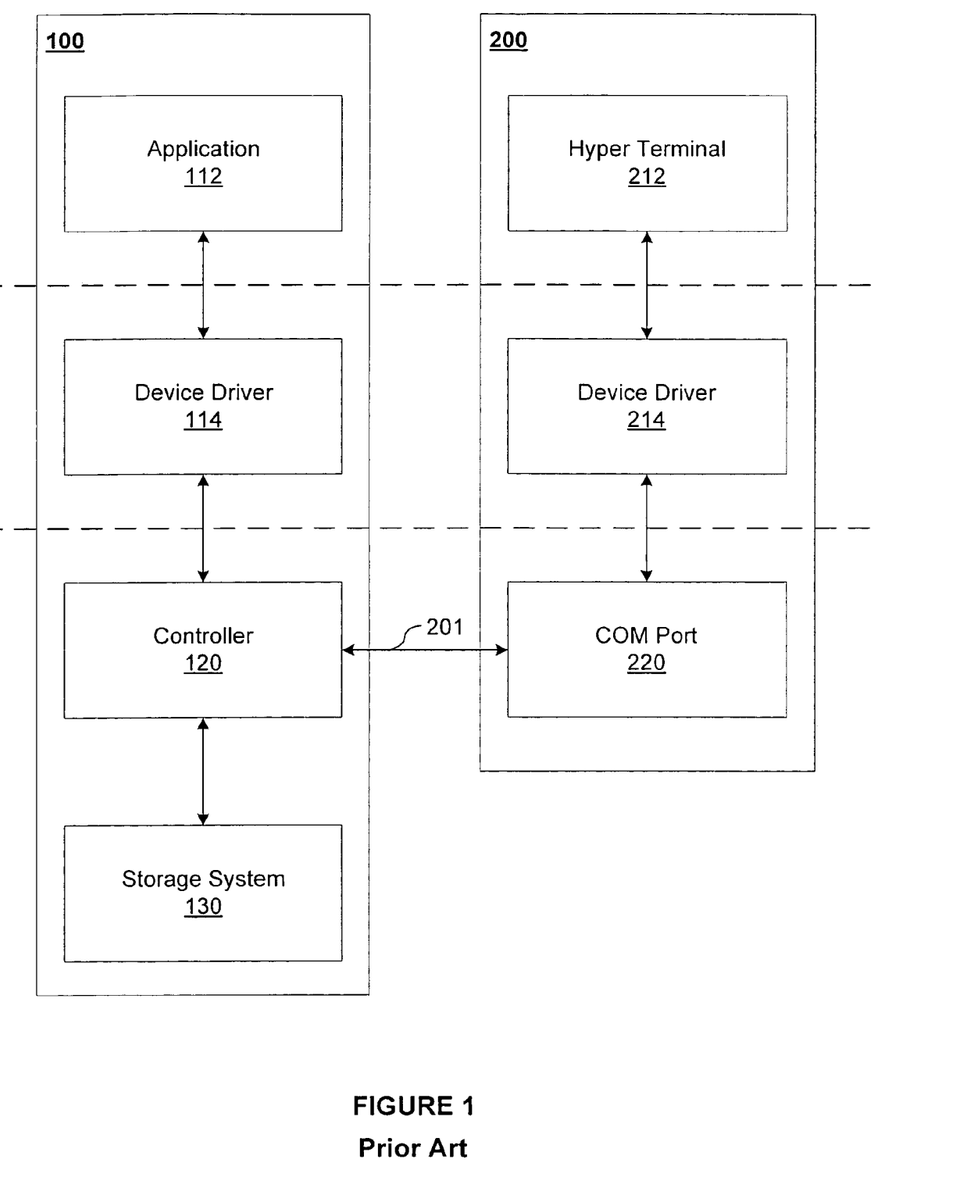
FIG. 1 depicts a functional block diagram illustrating an embodiment of a computer system connected to a debugging system.

In the development of embedded systems, such as data storage systems, debugging operations are typically performed using external hardware. The external hardware is used to monitor and control the system. FIG. 1 depicts an exemplary system of hardware used to debugging a storage system.

FIG. 1 illustrates a simplified functional view of computer system 100, which comprises one or more applications 112 at an application level of the system, a device driver 114 at the hardware abstraction level, and controller 120 at the hardware level. Debugging system 200 is connected to computer system 100 via connection 201, which may be a serial connection. A hyper terminal application 212 transmits commands through COM (communications) port 220. Controller 120 receives the commands via connection 201 and processes the commands. The resulting data is transmitted through connection 201 to debugging system 200 and may be displayed by hyper terminal 212.

While developing firmware, it is very important to have a serial port or some other type of hardware connected to controller 120 to debug it while the code. This way, a developer has extensive information, which can help find and analyze problems. A developer can also step through the code while it is executing. This functionality also allows the developer to change execution order of the code. Essentially, the developer can have full control over the software that is being developed. Although having hardware for external connections is beneficial for the development and testing of a system, the hardware is not generally included in the final product.

To reduce the final costs of the system, the hardware used to create the connection to the external hardware (e.g., debugging system 200) is typically removed. For example, a UART (universal asynchronous receiver/transmitter) (not shown), used to facilitated communications with external debugger 200, may be removed from controller 120 to help reduced the production costs of system 100. Although computer system 100 is typically very stable upon release to customers, computer system 100 may still experience some problems while being operated by a customer. Because these problems generally occur while computer system 100 is at a customer location and without any external hardware attached to system 100, it is very difficult to debug the problems that occur. The developer of the computer system may attempt to reproduce a customer's problem, but this can take considerable amounts of time. Furthermore, some problems experienced by a customer may not be able to be reproduced by the developer.

Accordingly, what is needed are systems and methods for gathering internal information of an embedded system without having additional external hardware connected.

SUMMARY OF THE INVENTION

In general, exemplary embodiments of the invention are concerned with systems and methods for gathering and displaying debug information. In an embodiment, a computer system is capable of gathering debug information of its storage system without requiring additional external hardware directly connected to the controller of the storage system. The computer system comprises a host processor and a storage system, which comprises a controller, communicatively coupled to the host processor and an array of storage devices, communicatively coupled to the controller. Resident on the computer system is an application for issuing debug commands to the controller of the storage system and for receiving and displaying data from the storage system. In an embodiment, the application may comprise an issuing module, operated by the computer system, for issuing debug commands to the controller of the storage system, and a receiving module, also operated by the computer system, for receiving and displaying data from the storage system.

In an embodiment, a method for issuing debug commands to the storage system involves receiving a debug command. The command may be entered by a user or may be automatically generated based upon information regarding computer system 100. In an embodiment, the debug commands may allow varying levels of access to the storage system and may also be password protected. In an embodiment, the debug command may also be checked against existing commands to determine if it is a valid command. In an embodiment, if the command is not valid, the process may return to request input of a different command. Because different vendors of controllers and storage devices may employ different or proprietary commands, an embodiment of the present invention may include the use of standard commands at a user level regardless of the controller or storage devices being accessed. If necessary, the standard command may be mapped to a corresponding proprietary command. In an embodiment, an IOCTL command or commands may be prepared. The debug command is sent to the device driver and, if necessary, forwarded to the storage system. In an embodiment, these methods may be performed by an issuing module.

An embodiment of the present invention includes methods for processing a debug command. In an embodiment, the controller receives a debug command via the device driver. The controller may be configured to determine if the received command is supported. If the command is not supported by the controller, the controller may indicated that the received command is not supported and return that data for display to a user. If the command is supported, the command is processed and the data returned for display to a user.

In an embodiment, the data received from the storage system may be formatted and displayed for a user. In one embodiment, the method of receiving and displaying the data may be performed by a receiving module.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be performed in a variety of ways and using a variety of means, including software, hardware, firmware, or a combination thereof. Accordingly, the embodiments described below are illustrative of specific embodiments of the invention and are meant to avoid obscuring the invention.

Reference in the specification to "one embodiment," "a preferred embodiment," or "an embodiment" means that a particular feature, structure, characteristic, or function described in connection with the embodiment is included in at least one embodiment of the invention. The appearances of the phrase "in one embodiment," "in an embodiment," or the like in various places in the specification are not necessarily all referring to the same embodiment.

Figure 2:
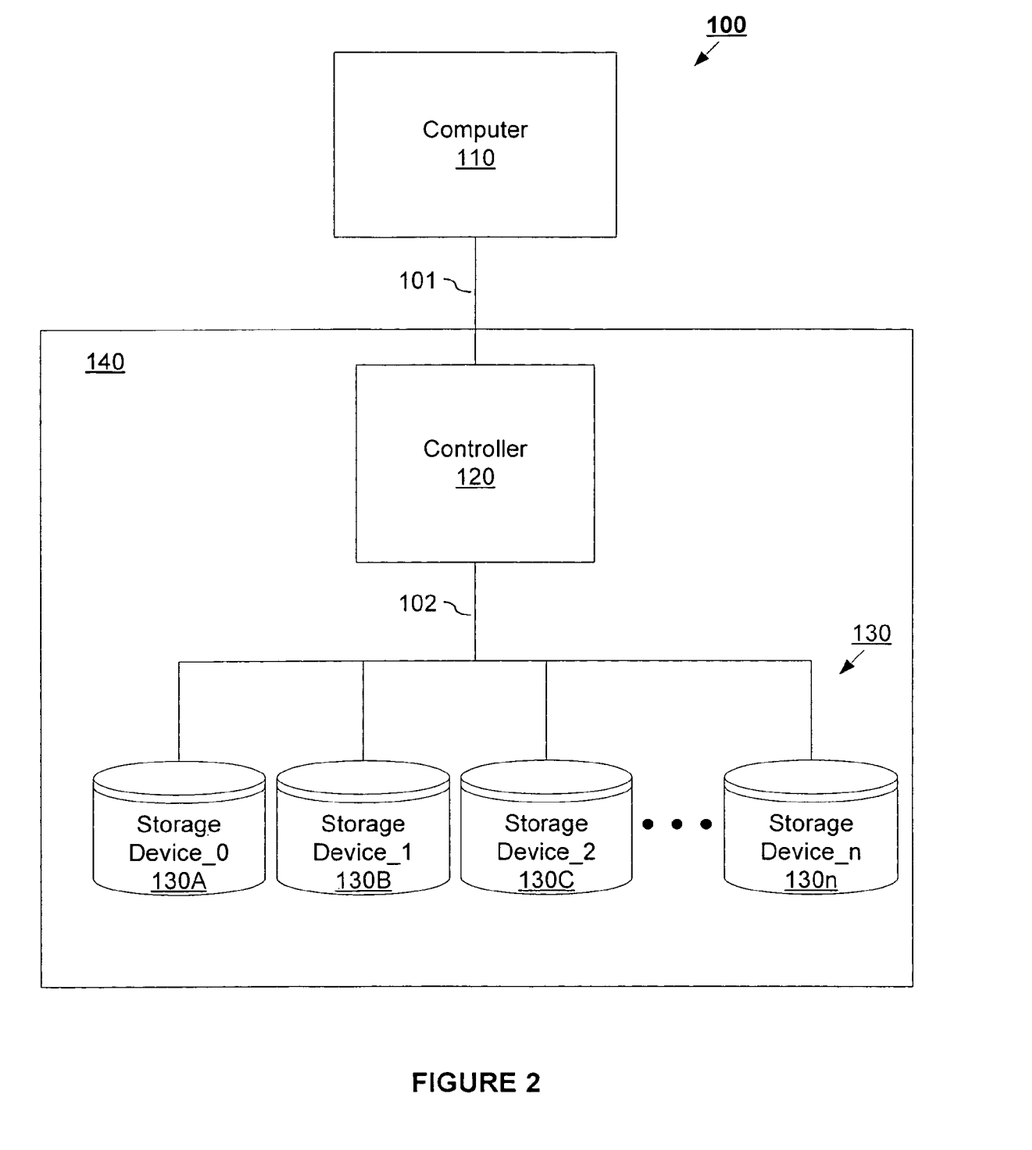
FIG. 2 depicts a functional block diagram of computer system in which exemplary embodiments of the present invention may operate.

Various systems in accordance with the present invention may be constructed. FIG. 2 is a block diagram illustrating an exemplary system in which embodiments of the present invention may operate. It shall be noted that the present invention may operate, and be embodied in, other systems as well.

FIG. 2 is a diagram illustrating an exemplary environment for implementation of an embodiment of the present invention. FIG. 2 depicts a block diagram comprising a computer system 100 utilizing a storage system 140 comprising controller 120 and an array of storage devices 130 for data storage according to an embodiment of the present invention. System 100 includes a host computer 110 communicatively coupled across an interface 101 to a controller 120. Throughout this written description, the terms "coupled" and "communicatively coupled" shall be understood to include direct connections and indirect connections through one or more intermediary devices or components.

Computer 110 may be any type of apparatus having a host processor coupled to a memory (not shown) for retrieving data and for executing instructions stored in the memory. Such instructions may include instructions used to perform I/O (Input/Output) commands or operations with respect to one or more of the storage devices 130A-130n in the array of storage devices 130. Computer 110 is generally supported by an operating system to which controller 120 communicates. Controller 120 also communicates with the storage devices for controlling access to storage devices 130A-130n and I/O requests made by computer 110.

Controller 120 may be one or more disk array controllers for controlling I/O commands with respect to one or more of the storage devices 130A-130n in the array of storage devices 130, and/or for changing firmware (not shown) within the storage devices 130A-130n. Controller 120 is communicatively coupled across interface 102 to a data storage system comprising an array of storage devices 130. Storage devices 130A-130n may include one or more of the following: magnetic disks, optical disks, solid-state disks, or non-volatile electronic storage elements. Controller 120 may include a processor (not shown) for fetching data and instructions stored in memory (not shown) to perform or execute commands, including I/O operations and coordinating data management operations across the array of storage devices 130.

Figure 3:
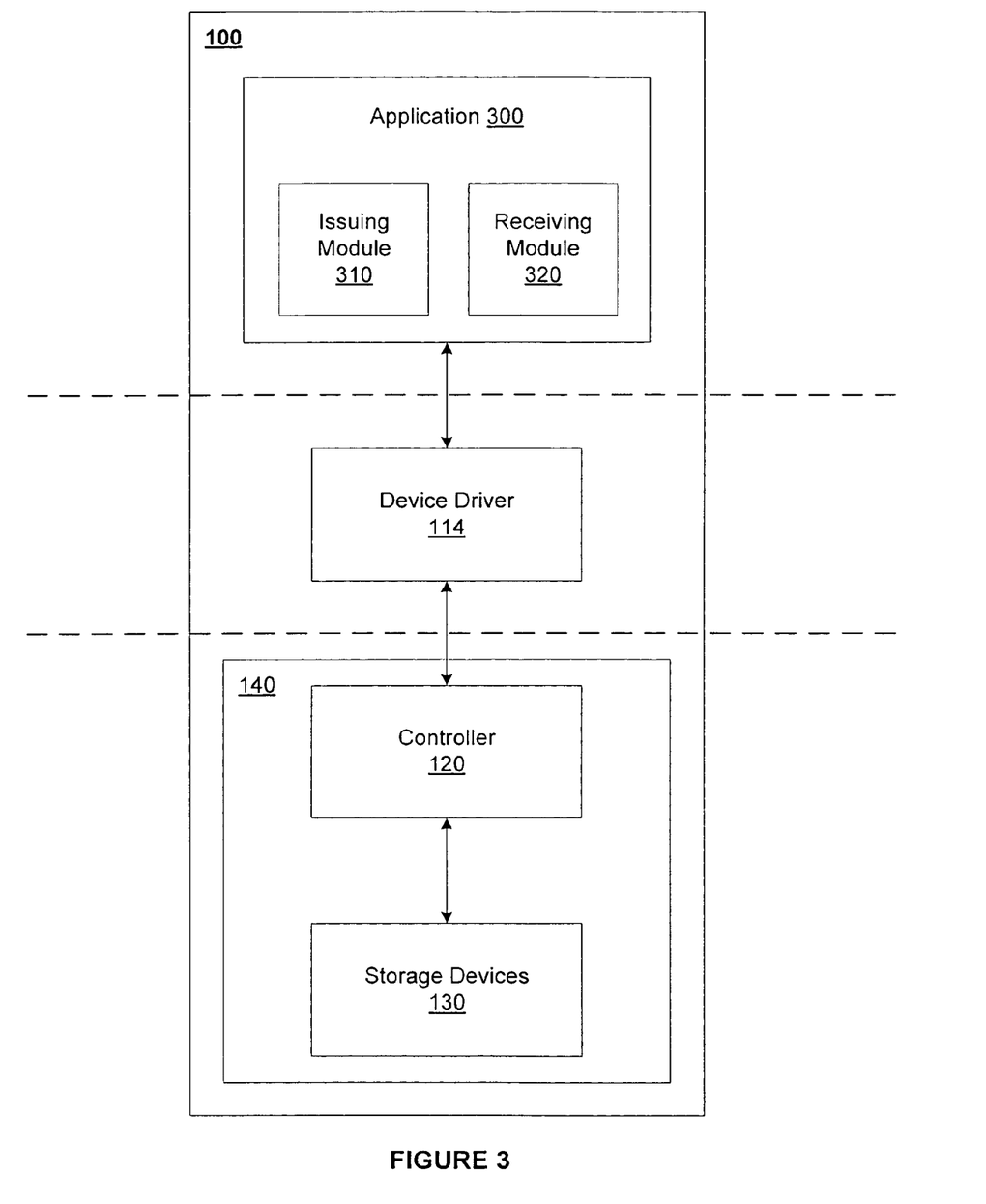
FIG. 3 depicts a functional block diagram of computer system according to an embodiment of the present invention.

FIG. 3 depicts a functional block diagram on an embodiment of a computer system 100 according to an embodiment of the present invention. In an embodiment, computer system 100 includes an application 300 communicatively coupled with device driver 114. Device driver 114 is communicatively coupled to controller 120 via a mailbox or register interface, and controller 120 is communicatively coupled to storage devices 130. Controller 120 and the array of storage devices 130 form the storage system 140 for computer system 100. In an embodiment, controller 120 may be a RAID controller. Application 300 receives a command from a user and, if necessary, may map the command to a proprietary command associated with the controller. Application 300 sends the command to the device driver 114. Application 300 may also issue IOCTL (input/output control) calls to retrieve log information from controller 120. When a command is completed or executed, application 300 receives the reply data, understands the format of the reply, and may display the data to a user. In an embodiment, application 300 may reformat the data into a user-friendly format.

Application 300 may comprise an issuing module 310 and a receiving module 320, to perform the functions listed above as well as additional functionality. In an embodiment, these modules may communicate with each other and with device driver 114 and/or controller 120. Each module may be implemented in software, hardware, firmware, or any combination thereof. It shall be noted all or part of the functionality of each of the modules may be combined together or divided into sub-modules. In an embodiment, all or part of the functionality of the modules in application 300 may be performed by one or more of the following: computer 100, device driver 114, controller 120, and one or more of the storage devices 130.

Firmware of controller 120 provides API (application programming interfaces) or controller commands to access firmware data structure. When problem occurs, a developer can access the firmware data structures via the controller commands. When a debug command is issued, the firmware can execute this command. In an embodiment, the firmware may be issued with high priority set so that the command may be executed immediately.

Figure 4:
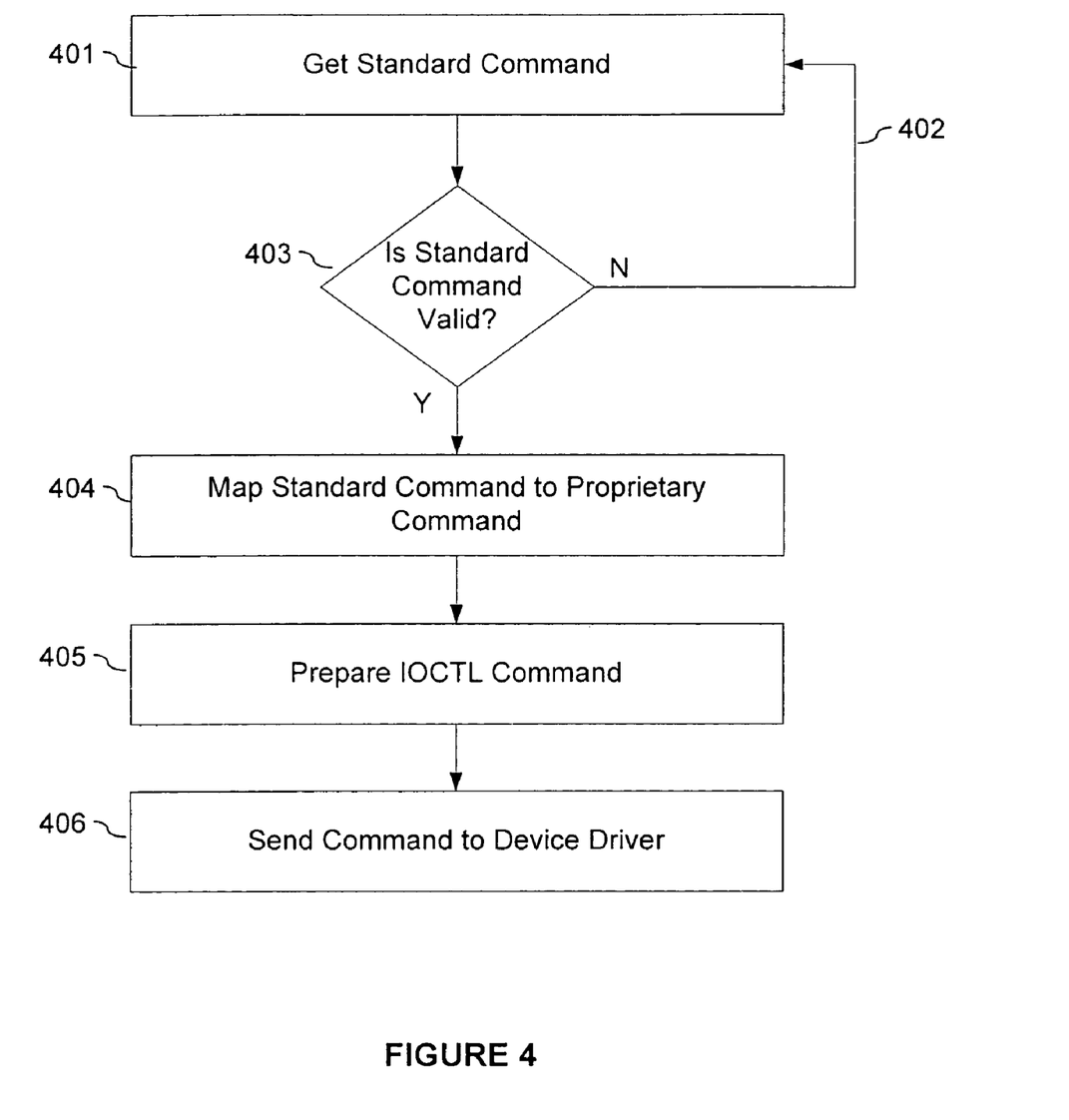
FIG. 4 illustrates an embodiment of a method for issuing debug commands to a storage system according to an embodiment of the present invention.

FIG. 4 illustrates an embodiment of a method for issuing debug commands to a controller according to an embodiment of the present invention. In an embodiment, a debug command is obtained (401). The command may be entered by a user or may be automatically generated based upon information regarding computer system 100, such as an error message. In an embodiment, the debug command may be checked (403) against existing commands to determine if it is a valid command. In an embodiment, if the command is not valid, the process may return (402) to request that a different command be entered (401).

Different vendors of controllers 120 and storage devices 130 may employ different or proprietary commands. An embodiment of the present invention may include the use of standard commands at a user level (e.g., step 401) regardless of the controller 120 or storage devices 130 being accessed. If necessary, the standard command is mapped (404) to a corresponding proprietary command.

In an embodiment, an IOCTL command or commands may prepared (405). IOCTL stands for Input/Output Control and is an operating system format of the command. The formatted command is sent (406) to the device driver 114. In an embodiment, the method illustrated in FIG. 4 may be performed by issuing module 310.

Figure 5:
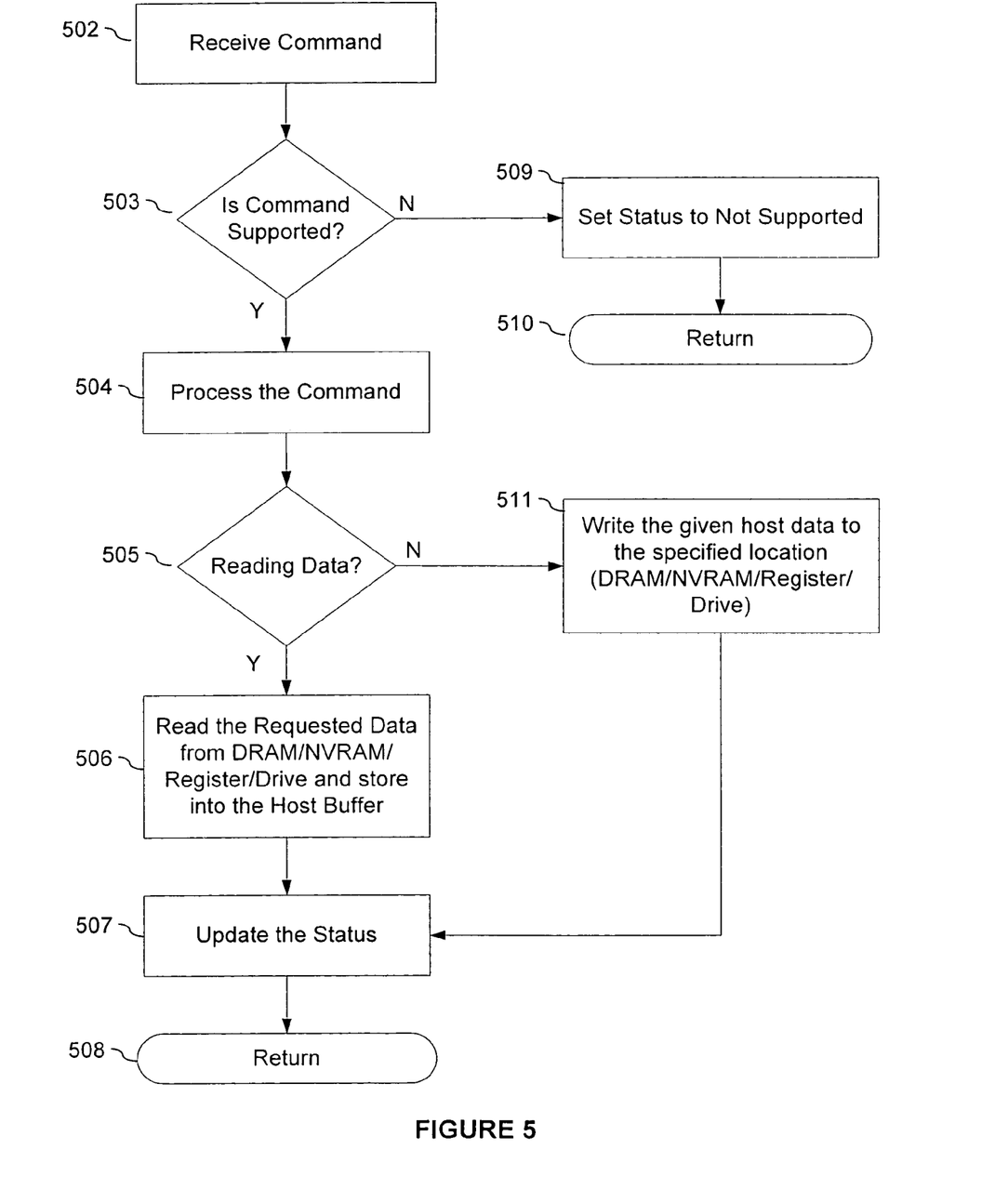
FIG. 5 illustrates an embodiment of a method for processing a debug command according to an embodiment of the present invention.

FIG. 5 illustrates an embodiment of a method for processing a debug command according to an embodiment of the present invention. In an embodiment, controller 120 receives (502) a command from application 300 via device driver 114. Controller 120 may be configured to determine if the received command is supported (503). That is, controller 120 may verify that the received command is one in which controller 120 can execute. If the command is not one that controller 120 can execute, controller 120 may indicated that the received command is not supported (509) and return (510) that information to the application 300 for display to the user. If the command is supported, the command is processed (504).

In an embodiment, the commands may be provided such that, a developer can have full access (GET/SET) to data structures and be able to step though the entire life cycle of the command. It should be noted that even the execution of the firmware code may be modified. Thus, the present invention provides much of the features of hardware debuggers but without requiring hardware attached to the system. In an embodiment, access to internal data structures may be password protected so that data is secured and only intended persons can have access. In yet a further embodiment, varying levels of access may be granted such that access may be limited to particular sets of commands. In an embodiment, these kinds of feature may be set during implementation of the firmware.

If the command involves (505) reading data, the requested data is read (506) from the DRAM, NVRAM, register, and/or storage devices 130 and transferred (506) into the host buffer. The status is updated (507) and the status information and data may be returned (508) to the application for display.

If the command involves writing data, the given host data is written (511) to the specified location, which may include the DRAM, NVRAM, register, and/or storage devices 130. The status is updated (507) and the status information may be returned (508) to the application for display.

Figure 6:
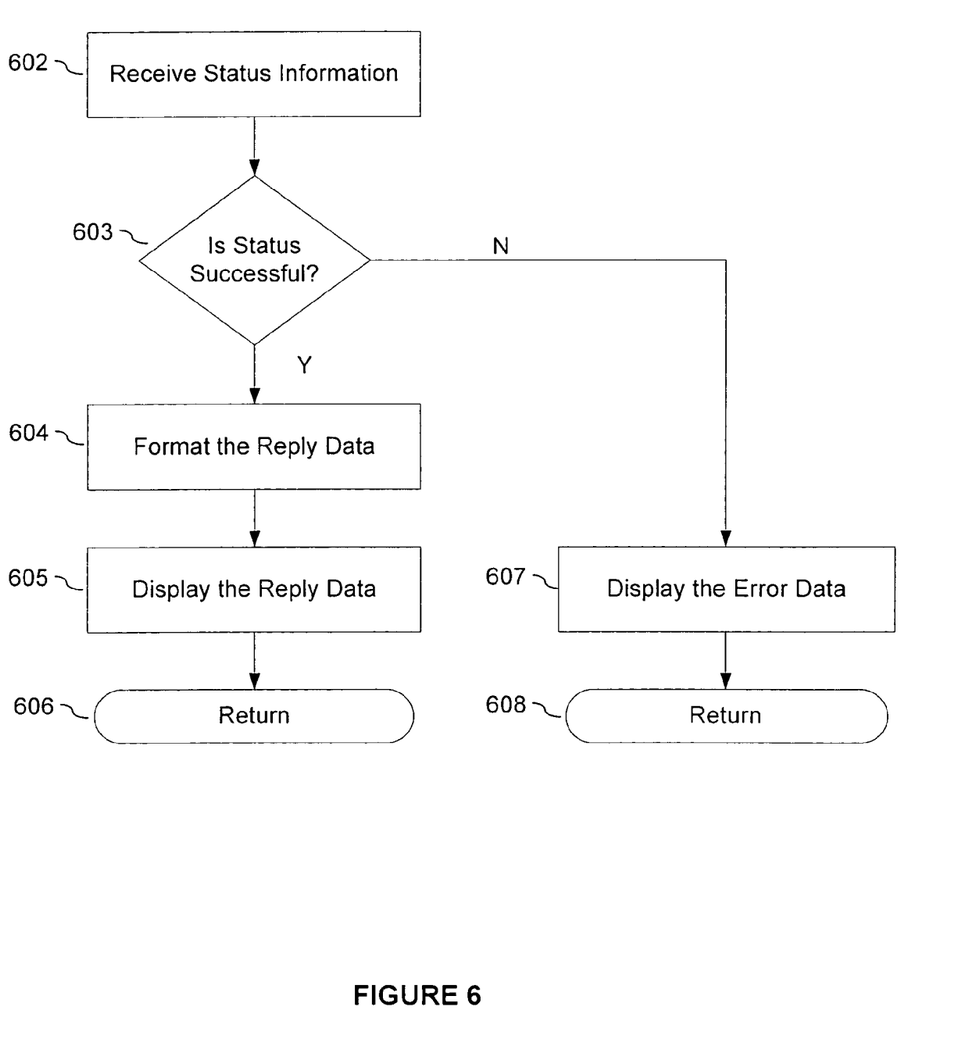
FIG. 6 illustrates an embodiment of a method for receiving information from a storage system according to an embodiment of the present invention.

FIG. 6 illustrates an embodiment of a method for receiving information from a controller according to an embodiment of the present invention. Information is received (602) following the completion or attempted completion of an issued command. The status information is checked (603) to determine if the command was successfully completed. A command may not be successful completed for any of a number of reasons, including that the command is not supported by controller 120. If the status was not successful, application 300 may be configured to display error data, which may included one or more error messages. If the status was successful, the status information, which may include reply data such as from READ operation, received from controller 120 may be formatted (604) and displayed (605) for a user. In an embodiment, the method illustrated in FIG. 6 may be performed by receiving module 320.

One skilled in the art will recognize that the present invention includes a number of advantages. The present invention provides new methods of data gathering with minimal changes in the firmware and utility. The present invention provides much of the functionality of a hardware debugger without requiring the additional hardware. The present invention may be made platform (or operating system) independent and may be implemented for a number of embedded systems. Thus, these systems and methods may be applicable to any of a number of kinds of embedded systems where external hardware is typically required to analyze and/or gather firmware information.

When a problem occurs at a customer's site, the present invention provides ready and easy methods for a developer to debug a problem directly instead of relying solely on log data or waiting for a tester to reproduce the problem, assuming that the tester is successful in reproducing the problem. One skilled in the art will also recognize that there is no need for a developer to be physically present to debug the problems. A developer may be remotely present and debug the problem the same way as if the developer were sitting at the system 100. This added functionality allows for a number of customer issues to be solved quicker and more readily since a problem can be addressed as soon as it occurs.

These advantages also result in reducing the time to fix problems. The present invention also allows a developer to address more issues in a shorter time span as compared with old methods of debugging. Since the time of fixing a problem is reduced, the stability of the system increases as compared to using old methods of debugging. Furthermore, because the present invention increases a developer's ability to debug a system that has been deployed to a customer, it can reduce the probability that a problem will reoccur since the problem is more likely to be solved when it is reported.

The above description is included to illustrate embodiments of the present invention and is not meant to limit the scope of the invention. One skilled in the art will recognize that the present invention has applications beyond embodiments and illustrated examples. Accordingly, it shall be understood that neither the number of storage devices nor their configuration are critical to the present invention. The scope of the invention is to be limited only by the following claims. From the above discussion, many variations will be apparent to one skilled in the art that would yet be encompassed by the scope of the present invention.

We claim:

1. A method for gathering debug information from a storage system comprising a RAID controller and a plurality of storage devices controlled by said RAID controller, the method comprising:

responsive to receiving a debug command, processing the debug command by performing the steps comprising:
generating a proprietary RAID controller command that is supported by said RAID controller based upon the debug command; and
sending the proprietary RAID controller command to said RAID controller, the proprietary RAID controller command modifying firmware code of said plurality of storage devices; and
responsive to receiving data from said RAID controller about a result of said proprietary RAID controller command, displaying the data to a user.

2. The method of claim 1 wherein the step of generating the proprietary RAID controller command based upon the debug command comprises identifying a proprietary command associated with the debug command, wherein the proprietary command is associated with the controller.

3. The method of claim 2 wherein the proprietary command is in an IOCTL format.

4. The method of claim 1 further comprising the step of: determining if the debug command is supported by the RAID controller.

5. The method of claim 4 further comprising the step of: responsive to a determination that the debug command is not supported by the RAID controller, requesting input of a different debug command.

6. The method of claim 1 wherein the data comprises status data associated with the proprietary RAID controller command.

7. The method of claim 6 wherein the status data is associated with a READ operation.

8. A computer system for gathering debug information from a storage system comprising a RAID controller and a plurality of storage devices controlled by said RAID controller, said system comprising:
  an issuing module, coupled to receive a debug command, the issuing module generating a proprietary RAID controller command associated with the debug command and issuing the proprietary RAID controller command;
  a receiving module, coupled to receive data from the storage system, the receiving module displaying the data to a user;
  a device driver, coupled to receive the proprietary RAID controller command, the device driver dispatching the proprietary RAID controller command to the storage system; and
  wherein said RAID controller is coupled to receive the proprietary RAID controller command, the RAID controller executing the proprietary RAID controller command by communicating with at least one storage device of said plurality of storage devices within the storage system, wherein the execution of the proprietary RAID controller command at least in part includes gathering debug information from the storage system and modifying firmware code of said at least one storage device of said plurality of storage devices.

9. The computer system of claim 8 wherein generating the proprietary RAID controller command based upon the debug command is performed by identifying a proprietary command associated with the debug command, wherein the proprietary command is associated with the RAID controller.

10. The computer system of claim 8 wherein the issuing module determines if the debug command is supported by the RAID controller.

11. The computer system of claim 8 wherein:
  responsive to a determination that the proprietary RAID controller command is not supported by the RAID controller, the issuing module requests input of a different debug command.

12. The computer system of claim 8 wherein the data comprises status data associated with the proprietary RAID controller command.

13. The computer system of claim 12 wherein the status data is associated with a READ operation.

14. A computer program product comprising computer-executable instructions embodied in a computer-readable medium, the computer program for performing the method comprising:
  responsive to receiving a debug command, processing the debug command by performing the steps comprising:
    generating a proprietary RAID controller command that is supported by a RAID controller of said storage system based upon the debug command; and
    sending the proprietary RAID controller command to said RAID controller of the storage system, the proprietary RAID controller command modifying firmware code of at least one of a plurality of storage devices of said storage system that is controlled by said RAID controller; and,
  responsive to receiving data from the RAID controller of the storage system about a result of said proprietary RAID controller command, displaying the data to a user.

15. The computer program product of claim 14 wherein the step of generating the proprietary RAID controller command based upon the debug command comprises identifying a proprietary command associated with the debug command, wherein the proprietary command is associated with the RAID controller.

16. The computer program product of claim 15 wherein the proprietary command is in an IOCTL format.

17. The computer program product of claim 14 further comprising the step of:
  determining if the debug command is supported by the proprietary RAID controller.

18. The computer program product of claim 17 further comprising the step of:
  responsive to a determination that the debug command is not supported by the RAID controller, requesting input of a different debug command.

19. The computer program product of claim 14 wherein the data comprises status data associated with the proprietary RAID controller command.

20. The computer program product of claim 19 wherein the status data is associated with a READ operation.

* * * * *